(12) United States Patent
Toyoda et al.

(10) Patent No.: US 11,225,282 B2
(45) Date of Patent: Jan. 18, 2022

(54) STEERING DEVICE

(71) Applicant: AISIN SEIKI KABUSHIKI KAISHA, Kariya (JP)

(72) Inventors: Makoto Toyoda, Kariya (JP); Ryota Sugiura, Kariya (JP); Kenji Imamura, Kosai (JP)

(73) Assignee: AISIN CORPORATION, Kariya (JP)

(*) Notice: Subject to any disclaimer, the term of this patent is extended or adjusted under 35 U.S.C. 154(b) by 52 days.

(21) Appl. No.: 16/826,811

(22) Filed: Mar. 23, 2020

(65) Prior Publication Data
US 2020/0339178 A1 Oct. 29, 2020

(30) Foreign Application Priority Data
Apr. 23, 2019 (JP) .............................. JP2019-081711

(51) Int. Cl.
*B62D 1/19* (2006.01)
*B62D 1/181* (2006.01)

(52) U.S. Cl.
CPC ................ *B62D 1/19* (2013.01); *B62D 1/181* (2013.01)

(58) Field of Classification Search
CPC ......... B62D 1/192; B62D 1/181; B62D 1/185
See application file for complete search history.

(56) References Cited

U.S. PATENT DOCUMENTS 5,188,392 A * 2/1993 Sugiki ................... B62D 1/181
                                                        280/775
8,967,016 B2 * 3/2015 Uesaka ................... F16C 35/02
                                                        74/493
2011/0314954 A1 * 12/2011 Matsuno ................ B62D 1/181
                                                        74/493
2012/0180594 A1 * 7/2012 Park ....................... B62D 1/181
                                                        74/493
2013/0233117 A1 * 9/2013 Read ...................... B62D 1/181
                                                        74/493
2014/0305252 A1 * 10/2014 Mizuno .................. B62D 1/187
                                                        74/493
2018/0281840 A1 * 10/2018 Yoon ...................... B62D 1/192

(Continued)

FOREIGN PATENT DOCUMENTS

DE   202018104386 U1 * 9/2018 ......... F16H 25/2003
JP   2004100770 A    4/2004

(Continued)

*Primary Examiner* — Paul N Dickson
*Assistant Examiner* — Matthew D Lee
(74) *Attorney, Agent, or Firm* — Buchanan Ingersoll & Rooney PC

(57) ABSTRACT

A steering device of a vehicle includes: a shaft mounted with a steering wheel; an inner tube rotatably covering the shaft; an outer tube fitting around the inner tube; a first housing reciprocably housing the outer tube along an axis direction of the shaft; an input unit provided on the outer tube; a screw member being provided in the first housing, and making the input unit reciprocable along the axis direction; and a worm gear rotating the screw member, and a motor driving the worm gear, being housed in a second housing mounted to the first housing. A vulnerable part is provided in the second housing in such a way that, when impact applies to the vehicle and another object collides with the second housing, the second housing breaks while maintaining a mounting state of the worm gear.

8 Claims, 3 Drawing Sheets

(56) References Cited

U.S. PATENT DOCUMENTS

2018/0319420 A1* 11/2018 Huber .................... F16H 25/24
2021/0129894 A1* 5/2021 Ryne ..................... B62D 1/187

FOREIGN PATENT DOCUMENTS

JP          2006347242 A  * 12/2006
JP          2009298229 A    12/2009
WO    WO-2020152188 A1 *  7/2020   ............ B62D 5/006

* cited by examiner

STEERING DEVICE

CROSS REFERENCE TO RELATED APPLICATIONS

This application is based on and claims priority under 35 U.S.C. § 119 to Japanese Patent Application 2019-081711, filed on Apr. 23, 2019, the entire content of which is incorporated herein by reference.

TECHNICAL FIELD

This disclosure generally relates to a steering device that is telescopic according to a physique of a driver and has a function of absorbing impact applied to the driver in an emergency.

BACKGROUND DISCUSSION

In the prior art, such a steering device includes, for example, one described in JP2009-298229A (Reference 1) (refer to paragraphs [0031] to [0038], FIGS. 1 and 2, and the like).

In this steering device, an outer tube integrally assembled with a steering wheel extends/contracts in relation to a fixed tube secured to a vehicle body. With the extension/retraction, a rotary drive from a motor and a worm gear that are provided in the fixed tube is transmitted to a nut member fixed to the outer tube through a screw member. Accordingly, an axle direction position of the steering wheel is determined by a change in a position of the nut member that screws together with the screw member according to rotation of the screw member.

An inner tube is inserted inside the outer tube through a pressure-welded ring. In addition, the inner tube is internally equipped with a steering axle that is rotational and retains the steering wheel on one end. In this way, normally, the outer tube, the inner tube, and the steering axle integrally extend/contract.

With this steering device, for example, if the vehicle collides with another object and the driver hits against the steering wheel, pushing-in force is applied to the steering axle, the inner tube, and the outer tube. Then, a screw shaft is pushed in through the nut member. As a result, external force acting to rotate the screw shaft is applied to the screw shaft. The screw shaft is connected to a worm wheel and a worm. The worm gear, in general, tends to have large reverse screw efficiency, thus, the worm hardly rotates by input from the worm wheel. As such, the screw shaft is restricted from rotating, which prevents the outer tube from moving.

As a result, the steering axle and the inner tube, receiving external force from the driver, enter into the outer tube against interlocking force, which absorbs the impact applying to the driver.

In order to exert an impact absorbing function in the steering device of Reference 1 described above, a mounting state of the worm gear or the like, needs to be sound in such a way that the worm gear can surely resist against force acting to push in the outer tube. However, depending on an installation environment of the steering device, the worm gear or the like may be damaged by interference from another object in the vehicle.

For example, a housing that stores a motor may be installed in a state of projecting in a predetermined direction from the fixed tube. The housing is installed in a predetermined direction in order to facilitate implementation of the steering device by adjusting an arrangement relation of the housing and other objects around the drivers feet in the vehicle interior. However, a brake pedal or the like is also arranged near this installation position, and a certain brake pedal may have a function of evacuating in a specific direction upon collision.

In particular, when an installation position of a motor housing interferes with a locus of evacuation of the brake pedal, the brake pedal may collide with the motor housing in an emergency, which may lead to damage to the housing. The damage to the housing may entail damage to a worm and a worm wheel that are accompanied and arranged in the housing.

In a case that the worm or the like is damaged, when pushing-in force is applied by the outer tube or the like as described above, the worm gear cannot exert a reverse screw effect, thereby allowing the screw shaft to rotate easily. As a result, the outer tube cannot receive counterforce from the fixed tube, and the inner tube and steering axle are strongly pushed in, which may harm exertion of the function of absorbing impact to the driver.

A need thus exists for a steering device which is not susceptible to the drawback mentioned above.

SUMMARY

A steering device according to this disclosure includes: a shaft to which a steering wheel is mounted; an inner tube covering the shaft in a rotatable manner; an outer tube fitting around the inner tube; a first housing housing the outer tube in a reciprocable manner along an axial direction of the shaft; an input unit provided on the outer tube; a screw member being provided in the first housing, acting on the input unit, and making the input unit reciprocable along the axial direction; and a worm gear and a motor being housed in a second housing mounted to the first housing. The worm gear rotates the screw member, and the motor drives the worm gear. A vulnerable part is provided in the second housing in such a way that, when impact applies to the vehicle and another object provided in the vehicle collides with the second housing, the second housing breaks while the worm gear remains to be mounted to the first housing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment (Overview)

Figure 1:
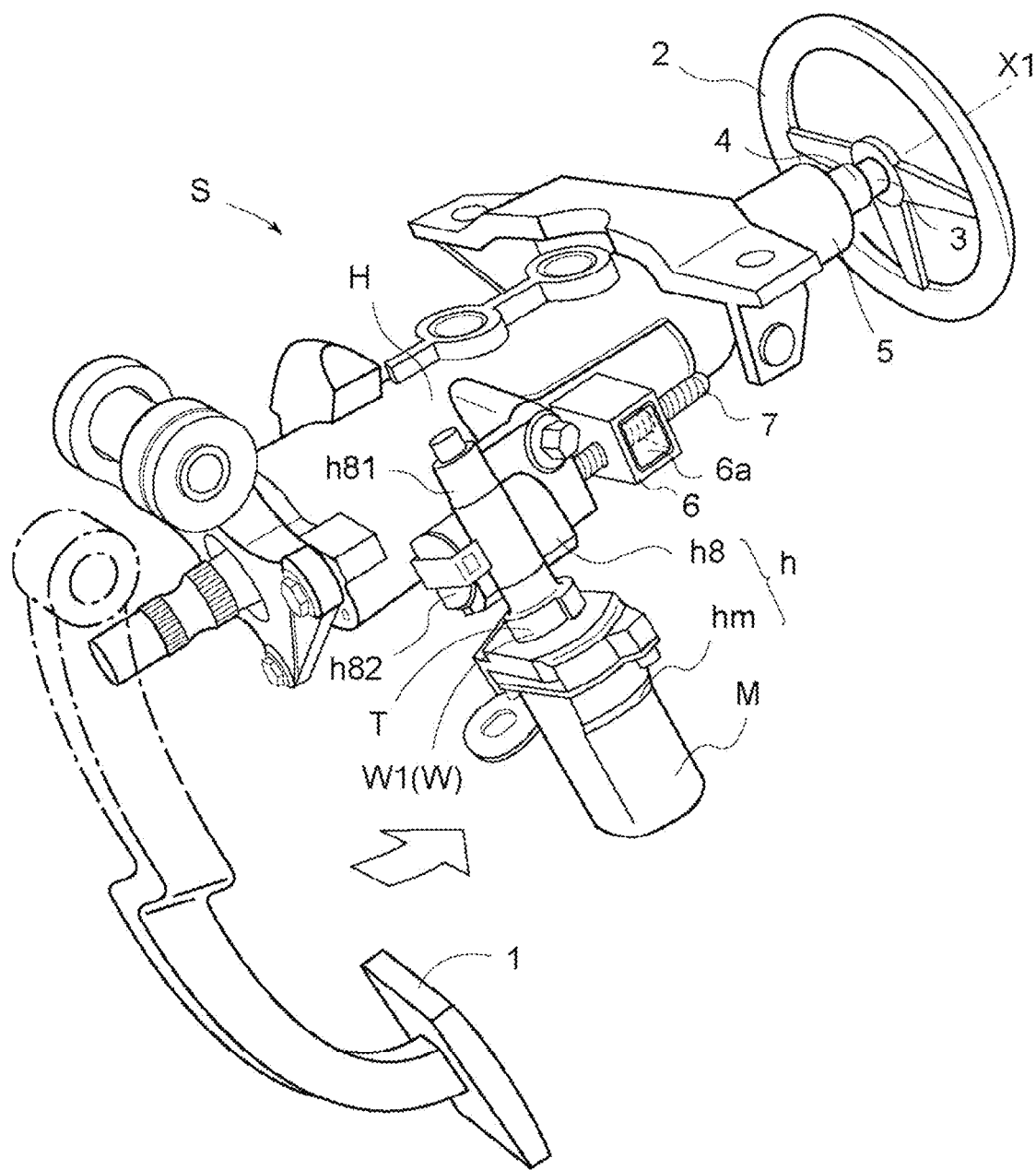
FIG. 1 is a perspective view illustrating a steering device according to a first embodiment.
Figure 2:
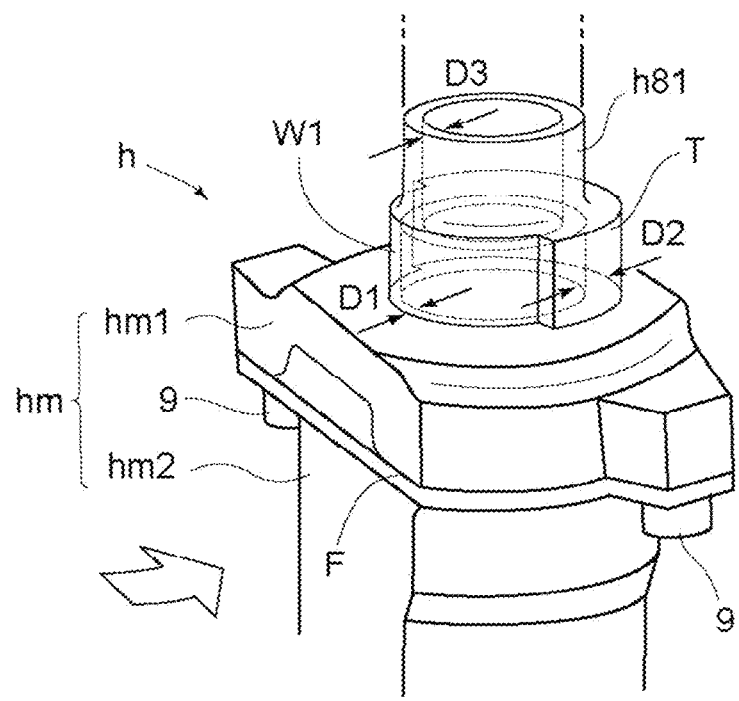
FIG. 2 is an explanatory view illustrating a configuration of a main part of the steering device according to the first embodiment.
Figure 3:
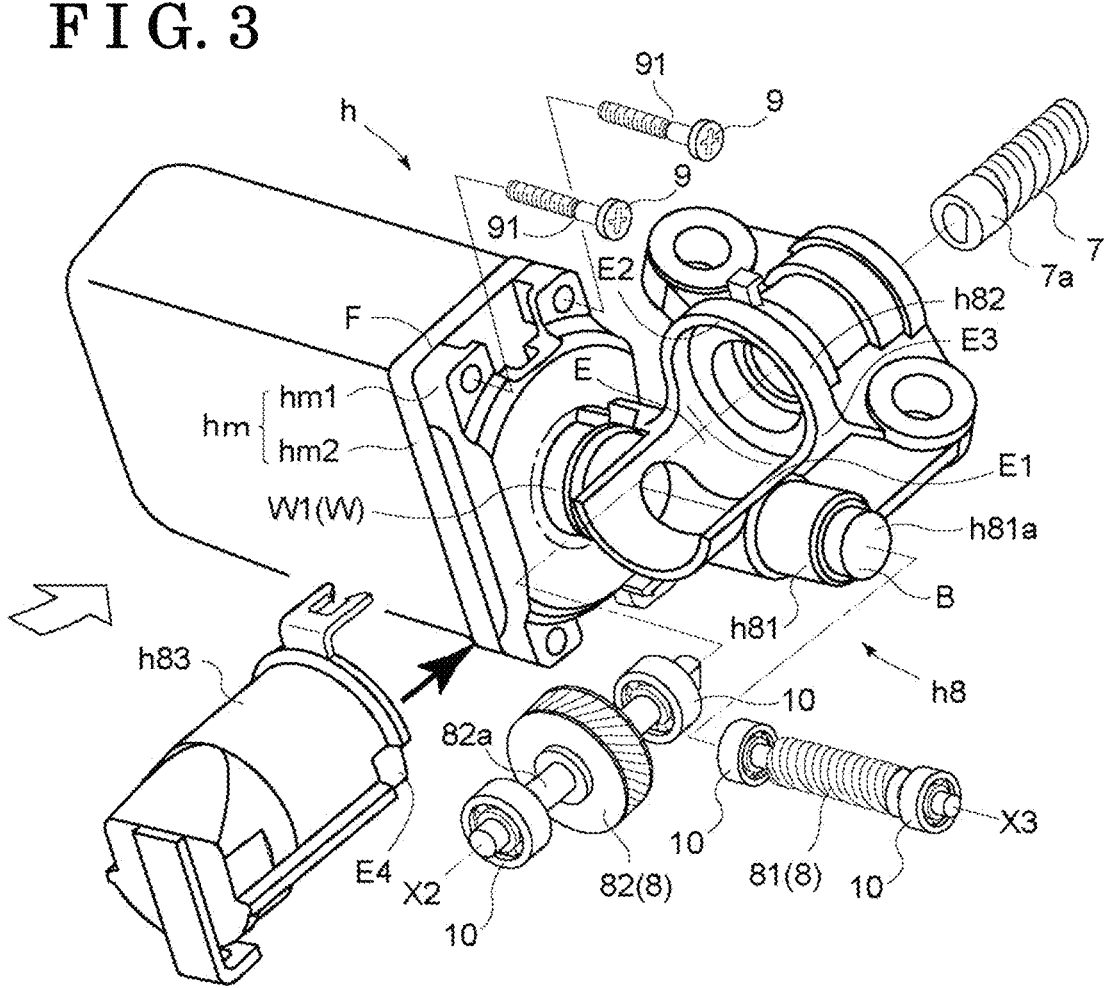
FIG. 3 is an exploded perspective view illustrating the configuration of the main part of the steering device according to the first embodiment.

FIGS. 1 to 3 illustrate a steering device S according to a first embodiment of this disclosure. The steering device S of this embodiment enables protection of a vehicle occupant by appropriately exerting an impact absorption function upon collision or the like of a vehicle. Specifically, the steering device S ensures, even when a brake pedal 1 inside the vehicle collides with a part of the steering device S, that the mounting state of a gear or the like constituting the drive mechanism is protected, and the slide function of the inner tube 4 or the like is appropriately exerted.

As illustrated in FIG. 1, the steering device S of this embodiment includes: a shaft 3 to which a steering wheel 2 is mounted; an inner tube 4 covering the shaft 3 in a manner the shaft 3 is rotatable; and an outer tube 5 fitting around the inner tube 4. While the details are not illustrated, the shaft 3 is coaxially retained inside the inner tube 4 by a bearing or the like.

The outer tube 5 fits around the inner tube 4 in a manner that the outer tube 5 functions integrally with the inner tube 4 in a normal state. However, upon collision or the like, when certain pushing-in force is applied to the shaft 3 through the steering wheel 2, the inner tube 4 slides in the axial direction X1 while generating certain friction force or the like at a sliding part provided between the inner tube 4 and the outer tube 5. This mechanism absorbs impact that is generated when the vehicle occupant hits against the steering wheel 2.

The outer tube 5 is slidably provided inside a first housing H that contains the whole steering device S thereinside. A telescopic mechanism is provided through the first housing H and the outer tube 5, and thus the position of the steering wheel 2 can be adjusted according to the physique of the vehicle occupant.

As illustrated in FIGS. 1 and 3, on a side of the tubular shape of the outer tube 5, an input unit 6 for inputting drive force of slide movement to the outer tube 5 is provided. The input unit 6 internally includes a nut member 6a incorporating a female screw part. The nut member 6a is screwed with a screw member 7 that is to be driven by a motor M.

The motor M is equipped inside a second housing h that is mounted to the first housing H. The second housing h includes: a motor storing part hm storing the motor M; and a gear storing part h8 internally including a worm gear 8 (i.e., a worm 81 and a worm wheel 82 that interlocks with the worm 81) that is connected to the drive axis of the motor M. The screw member 7 is connected to the worm wheel 82 in this mechanism.

The worm gear 8 that includes the worm wheel 82 and the worm 81 has high reverse screw efficiency. As such, even when the inner tube 4 is pushed-in due to impact applied to the vehicle, the worm gear 8 does not rotate, which restricts the pushing-in of the inner tube 4. Thus, by appropriately maintaining the mounting state of the worm 81 and the worm wheel 82, the outer tube 5 can gain counterforce from the first housing H. As a result, the inner tube 4 that received pushing-in force from the driver can slide in relation to the outer tube 5 under certain friction force.

Vulnerable Part

Accordingly, the steering device S of this embodiment has a vulnerable part W in the second housing h in such a way that at least the mounting state of the worm 81 and the worm wheel 82 is not affected even if the second housing h is damaged.

As for the vulnerable part W, for example, a thin part W1 is formed by thinning the thickness of the member. As illustrated in FIGS. 2 and 3, in the second housing h, a tube part T between the motor storing part hm that internally includes the motor M and a gear storing part h8 that internally includes the worm 81 and the worm wheel 82 is formed thinner. In FIG. 2, in the tube part T, only a semicircle on the side where other object, such as a brake pedal 1, comes into contact is formed as the thin part W1. Accordingly, the thickness D1 of the thin part is configured as thinner than the thickness D2 on the other side.

Note that, in the example of FIG. 2, the outer diameter of the worm storing part h81 adjoining the thin part W1 is smaller than that of the tune part T. The strengths of individual parts are exerted based on the individual cross section shapes of the parts. In this configuration, the tube part T that has a larger outer diameter is required to be preferentially damaged. Thus, when the thickness of the worm storing part h81 is defined as D3, D1 is preferably configured much thinner than D3.

The tube part T is a part where the drive axis of the motor M and the worm 81 are connected. While not illustrated in the drawings, for example, a recess of which cross section shape is a D-shape or a track shape is formed on an end of the worm 81, and the drive axis of the motor M, which has the same cross section shape, is inserted into the recess. As such, even when the second housing h breaks at the vulnerable part W, the worm 81 and the motor M can be easily separated.

By forming such a thin part W1, damage can be more surely induced to the thin part. The thin part W1 can be easily formed, for example, by adjusting a mold for die-casting a second housing h or by grind-processing this part after forming the second housing h. In this way, the second housing h that exerts the expected function can be efficiently attained.

Motor Storing Part

As illustrated in FIG. 3, the motor storing part hm includes: a base part hm1 that is integrally formed with the gear storing part h8 through the tube T; and a case part hm2 that is mounted to the base part hm1. The base part hm1 and the case part hm2 are fastened using a plurality of fixing screws 9 and the like.

Gear Storing Part

On the other hand, the gear storing part h8 includes: a worm storing part h81 internally including the worm 81 coaxially with the axis X3 of the drive axis of the motor M; and a wheel storing part h82 internally including the worm wheel 82 that interlocks with the worm 81. The worm 81 is supported at both ends by bearings 10 in the worm storing part h81. The worm 81 and two bearings 10 are inserted in the worm storing part h81 from the bottom side of the base part hm1, for example, after the worm 81 and the two bearings 10 are assembled as illustrated in FIG. 3.

As illustrated in FIG. 3, the worm wheel 82 is mounted in a state where the lid part h83 is removed from the wheel storing part h82. The worm wheel 82 is integrally mounted to, for example, a wheel axle 82a. This wheel axle 82a is also supported at both sides by bearings 10 inside the wheel storing part h82. While not illustrated in the drawings, the lid part h83 has a receiving seat, at the bottom thereof, for retaining one of the bearings 10. The other one of the bearings 10 is retained by a receiving seat formed on the wheel storing part h82.

Note that, since the lid part h83 is configured as a separate member, the wheel storing part h82 has an opening E, which raises a concern over the decreased strength of the wheel storing part h82. As illustrated in FIG. 3, the opening E includes: a first edge E1 extending along the axial direction X2 of the wheel axle 82*a*; and a second edge E2 that is perpendicular to the first edge E1. When external force applies to the motor storing part hm, a portion of the external force may be transmitted to the gear storing part h8, resulting in stress concentration on the intersection part of the first edge E1 and the second edge E2. In such a case, in addition to breakage of the vulnerable part W, the gear storing part h8 may deform, which might damage the mounting state of the worm gear 8.

Thus, as illustrated in FIG. 3, an R part E3 is provided at the intersection part between the first edge E1 and the second edge E2, alleviating stress concentration on the R part E3. As such, the lid part h83 has an insert part E4 that is inserted inside the R part E3 to circumvent the R part E3.

Of the two ends of the wheel axle 82*a*, the shape of one end on the side where it is connected to the screw member 7 is formed in a D-shape or a track-shape in the same way as that of the worm 81. This end is inserted into the connection part 7*a* of the screw member 7, which has a hole of a like shape. With such configurations, the drive force from the motor M is transmitted to the screw member 7.

The thin part W1 of this embodiment is substantially formed over the semicircle of the tube part T, for example, as illustrated in FIG. 2. This part is an area including a surface on the side where, for example, a brake pedal 1 as other object comes into contact with the second housing h from the arrow direction in an emergency. Upon collision with the brake pedal 1, the motor storing part hm tends to bend around the thin part W1, generating a tensile stress around the thin part W1. Accordingly, by making this part thinner, breakage or damage from this part can be induced. Consequently, the gear storing part h8 in which the worm 81 and the worm wheel 82 are mounted is prevented from damage.

The thin part W1 can be obtained by adjusting a mold for die-casting the second housing h. Alternatively, the thin part W1 can be formed through additional grind-processing after the second housing h is formed by casting or grind-processing. As such, by forming the thin part W1 on the side where other object, such as the brake pedal 1, comes into contact, stress concentration can be generated when impact is applied, and the damaged part can be limited only to the motor storing part hm. In this way, the protection effect of the worm gear 8 is further enhanced. In addition, this configuration can also attain the effect of suppressing costs without the need to largely change the configuration of the conventional steering device S.

Worm Regulating Part

In the worm gear 8 that includes the worm 81 and the worm wheel 82, the worm 81 is normally less likely to rotate by the action of the worm wheel 82, due to the reverse screw efficiency. However, when large external force instantly applies to the worm 81, the worm 81 may rotate to some extent. Thus, this configuration is configured to provide a regulating part B on an end of the worm 81 on the side where it screws forward in response to external force from the worm wheel 82, in such a way that the worm 81 that remains in the second housing h upon occurrence of impact or the like keeps remaining in the worm storing part h81 due to the pushing-in force of the outer tube 5. By regulating the end of the worm 81, rotation and movement of the worm 81 along the axial direction X3 is prevented.

Figure 4A:
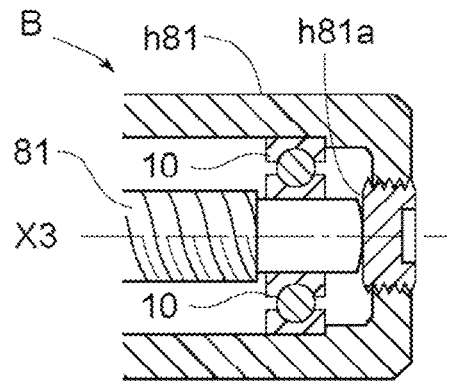
FIGS. 4A and 4B are explanatory views illustrating configurations of a regulating part of a worm according to the first embodiment.
Figure 4B:
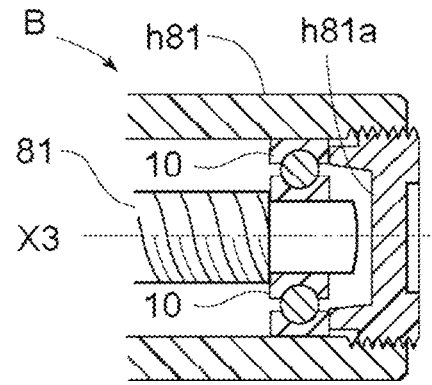

Specifically, first, as illustrated in FIGS. 4A and 4B, among both ends of the worm 81, the end on the opposite side to the motor M is configured to be regulated by the internal surface of the worm storing part h81. In addition, the pitch direction of the screw member 7 is set in such a way that, upon pushing-in of the outer tube 5, the teeth of the worm wheel 82 rotate in a direction where they move the worm 81 in the opposite direction to the motor M.

In other words, when the outer tube 5 is pushed in, the pitch of the screw member 7 needs to rotate in a direction where the worm wheel 82 presses the worm 81 against the bottom part h81*a* side of the worm storing part h81. In the case of the steering device S illustrated in FIG. 1, the screw member 7 is configured as a left screw. Accordingly, when the nut member 6*a* is pushed in on the worm gear 8 side through the screw member 7, the screw member 7 that has the left pitch rotates in an anti-clockwise direction when the screw member 7 is seen from the worm 81 side. As such, the worm 81 is enabled to move in a direction toward the bottom part h81*a* of the worm storing part h81.

The regulating part B of the worm 81 may be configured in a variety of configurations, for example, as illustrated in FIGS. 4A and 4B. FIG. 4A is a configuration where an end of the worm 81 is received by the bottom part h81*a* of the worm storing part h81. Note that, to securely regulate the movement of the worm 81 in the axial direction X3, as well as, not to generate excessive resistance to the rotary drive of the worm 81 at normal time, it is convenient that, for example, the bottom part h81*a* is configured as a screw-in structure and it can be attached to an arbitrary position of the worm storing part h81.

Further, as illustrated in FIG. 4B, the bearing 10 that supports an end of the worm 81 may be received by the bottom part h81*a* of the worm storing part h81. This configuration facilitates securing a larger contact area between the bottom part h81*a* and the bearing 10. Thus, when impact is applied, concentration of stress that occurs at the bottom part h81*a* is alleviated, and the worm storing part h81 is less likely to be damaged.

In addition to this, the effect of protecting the worm storing part h81 from damage can be enhanced by arranging a metal leaf spring member or a rubber member of various shapes between the end of the warm 81 or the bearing 10 and the bottom part h81*a* to add a buffer function between the worm 81 and the bottom part h81*a*.

Second Embodiment

Figure 5:
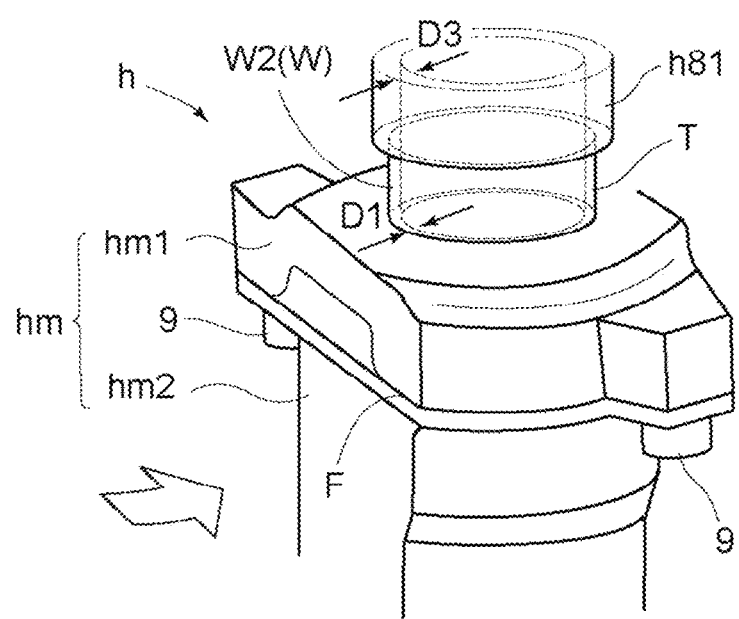
FIG. 5 is an explanatory view illustrating a configuration of a main part of the steering device according to a second embodiment.

As illustrated in FIG. 5, the vulnerable part W, in the second housing h, may be a small diameter part W2 that is configured by thinning the outer diameter of the tube part T between the motor storing part hm and the worm storing part h81. The small diameter part W2 refers to a part of which outline of the outer periphery has a smaller cross section area than the cross section area of the outline of the adjoining motor storing part hm or worm storing part h81.

By forming such a small diameter part W2, when bending force is generated in the second housing h by external force that is applied in the arrow direction, the bending force can be inescapably concentrated on the small diameter part W2. The wall thickness D1 of the small diameter part W2 is preferably thinner than the wall thickness D3 of the adjoining worm storing part h81. However, having a smaller cross section area of its outline, even if the small diameter part W2 has a thicker wall thickness than the wall thickness of the adjoining motor storing part hm, the degree of stress concentration is likely to increase. Thus, breakage is likely to be induced to this part.

Note that such a small diameter part W2 decreases influences affected by the shape of the outline. Thus, for example, a tube-shaped outline does not limit the direction in which other object should collide, thereby decreasing restrictions with regard to the mounting position of the second housing h to the first housing H. Further, when the small diameter part W2 is manufactured by grind-processing, the tube shape makes the processing very easy.

Other Embodiments

As a method of forming a vulnerable part W in the second housing h, for example, the mounting part of the motor storing part hm may be configured to break in response to impact. To this end, for example, as illustrated in FIG. 3, the fixing screws 9 for mounting the motor storing part hm to the base part hm1 may have a constriction part 91.

This constriction part 91 is preferably configured to be positioned at a boundary between the base part hm1 and the motor storing part hm, that is, at the attachment surface F, in a state where the fixing screws 9 are fastened. When external force applies to the motor storing part hm, a portion of the motor storing part hm near the surface thereof on the side where the external force particularly applies tends to move away from the base part hm1, or, the entire motor storing part hm tends to move along the attachment surface F with the base part hm1. In this way, providing a constriction part 91 at this position, tensile or sheer force concentrates on the constriction part 91, making the fixing screw 9 easy to break. With such a configuration, the function of protecting the worm gear 8 can be exerted without widely changing the configuration of the conventional steering device S.

The steering device according to this disclosure is widely applicable to steering devices that use a motor and a worm gear to exert a telescopic function.

Feature Configuration

A steering device according to this disclosure includes: a shaft to which a steering wheel is mounted; an inner tube covering the shaft in a rotatable manner; an outer tube fitting around the inner tube; a first housing housing the outer tube in a reciprocable manner along an axial direction of the shaft; an input unit provided on the outer tube; a screw member being provided in the first housing, acting on the input unit, and making the input unit reciprocable along the axial direction; and a worm gear and a motor being housed in a second housing mounted to the first housing. The worm gear rotates the screw member, and the motor drives the worm gear. A vulnerable part is provided in the second housing in such a way that, when impact applies to the vehicle and another object provided in the vehicle collides with the second housing, the second housing breaks while the worm gear remains to be mounted to the first housing.

Effect

When impact is applied to the vehicle and the shaft is pushed in, rotation of the worm gear is blocked since the worm gear has high reverse screw efficiency, which restricts the pushing-in of the shaft. As such, an impact absorption function that is normally provided between the outer tube and the inner tube is excellently exerted.

Thus, by providing a vulnerable part of this configuration, even if impact is applied to the vehicle and another object in the vehicle collides with the second housing, an interlocking state between the worm gear and the screw member is maintained. In this way, a steering device with high safety in an emergency by exerting the impact absorption function can be provided.

In addition, providing the vulnerable part of this configuration does not require a large modification in the conventional configuration of a steering device. Thus, this configuration can be easily applied to various steering devices.

Feature Configuration

In the steering device according to this configuration, in the second housing, the vulnerable part may be a thin part provided between a portion storing the motor and a portion retaining the worm gear.

Effect

By forming such a thin part, damage occurrence can be more surely induced to the thin part. Such a thin part can be easily formed, for example, by adjusting a mold for die-casting the second housing or by grind-processing only the thin part on the second housing after forming the second housing. As such, the second housing that exerts an expected function can be efficiently attained.

Feature Configuration

In the steering device according to this configuration, the thin part may be formed in an area including a surface on a side where the another object comes into contact with the second housing.

Effect

As in this configuration, by forming the thin part on a side where another object comes into contact, stress concentration can be generated when impact force is applied. As such, an effect of protecting the worm gear can be further enhanced.

Feature Configuration

In the steering device according to this configuration, in the second housing, the vulnerable part may be configured as a small diameter part provided between a portion storing the motor and a portion retaining the worm gear.

Effect

With a small diameter part as in this configuration, when another object comes into contact with a part of the second housing, the impact force tends to concentrate on the small diameter part. As such, the second housing has an increased probability of damage to the small diameter part, and the worm gear can surely remain on the first housing side.

Feature Configuration

In the steering device according to this configuration, the second housing may have a regulating part, for a worm constituting the worm gear, that, when impact applied to the vehicle pushes in the shaft, and input from the screw member causes the worm to rotate and screw forward, comes into contact with an end of the worm in a screwing direction of the worm.

Effect

The worm gear includes a worm and a worm wheel, and, in general, an act of the worm wheel is unlikely to rotate the worm. However, when large external force instantly applies to the worm, the worm may be rotated to some extent. As such, in this configuration, there is a regulating part on an end of the worm on a side where the worm screws forward by external force from the worm wheel. In this way, minimizing rotation of the worm enhances a locking effect of the screw member by the worm gear.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering device of a vehicle, comprising:
   a shaft to which a steering wheel is mounted;
   an inner tube covering the shaft in a rotatable manner;
   an outer tube fitting around the inner tube;
   a first housing housing the outer tube in a reciprocable manner along an axial direction of the shaft;
   an input unit provided on the outer tube;
   a screw member being provided in the first housing, acting on the input unit, and making the input unit reciprocable along the axial direction; and
   a worm gear and a motor being housed in a second housing mounted to the first housing, the worm gear rotating the screw member, the motor driving the worm gear, wherein
   a vulnerable part is provided in the second housing in such a way that, when impact applies to the vehicle and another object provided in the vehicle collides with the second housing, the second housing breaks while the worm gear remains to be mounted to the first housing.

2. The steering device according to claim 1, wherein, in the second housing, the vulnerable part is a thin part provided between a portion storing the motor and a portion retaining the worm gear.

3. The steering device according to claim 2, wherein the thin part is formed in an area including a surface on a side where the another object comes into contact with the second housing.

4. The steering device according to claim 1, wherein, in the second housing, the vulnerable part is a small diameter part provided between a portion storing the motor and a portion retaining the worm gear.

5. The steering device according to claim 1, wherein the second housing has a regulating part, for a worm constituting the worm gear, configured such that, when impact applied to the vehicle pushes in the shaft, and input from the screw member causes the worm to rotate and screw forward, the regulating part comes into contact with an end of the worm in a screwing direction of the worm.

6. The steering device according to claim 2, wherein the second housing has a regulating part, for a worm constituting the worm gear, configured such that, when impact applied to the vehicle pushes in the shaft, and input from the screw member causes the worm to rotate and screw forward, the regulating part comes into contact with an end of the worm in a screwing direction of the worm.

7. The steering device according to claim 3, wherein the second housing has a regulating part, for a worm constituting the worm gear, configured such that, when impact applied to the vehicle pushes in the shaft, and input from the screw member causes the worm to rotate and screw forward, the regulating part comes into contact with an end of the worm in a screwing direction of the worm.

8. The steering device according to claim 4, wherein the second housing has a regulating part, for a worm constituting the worm gear, configured such that, when impact applied to the vehicle pushes in the shaft, and input from the screw member causes the worm to rotate and screw forward, the regulating part comes into contact with an end of the worm in a screwing direction of the worm.

\* \* \* \* \*